US009858427B2

(12) United States Patent
Mueller et al.

(10) Patent No.: US 9,858,427 B2
(45) Date of Patent: Jan. 2, 2018

(54) END-TO-END ENCRYPTION AND BACKUP IN DATA PROTECTION ENVIRONMENTS

(71) Applicant: International Business Machines Corporation, Armonk, NY (US)

(72) Inventors: Christian Mueller, Dichtelbach (DE); Dominic Mueller-Wicke, Weilburg (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/054,521

(22) Filed: Feb. 26, 2016

(65) Prior Publication Data

US 2017/0249467 A1 Aug. 31, 2017

(51) Int. Cl.
*G06F 21/60* (2013.01)
*H04L 9/08* (2006.01)
(Continued)

(52) U.S. Cl.
CPC ........ *G06F 21/602* (2013.01); *G06F 11/1451* (2013.01); *G06F 11/1464* (2013.01);
(Continued)

(58) Field of Classification Search
CPC ............... G06F 21/602; G06F 11/1451; G06F 11/1464; H04L 63/0428; H04L 9/0822; H04L 2201/80
See application file for complete search history.

(56) References Cited

U.S. PATENT DOCUMENTS

| 8,412,934 B2 | 4/2013 | De Atley et al. |
| 8,429,425 B2 | 4/2013 | Ko et al. |

(Continued)

FOREIGN PATENT DOCUMENTS

CN 103748827 A 4/2014

OTHER PUBLICATIONS

International Search Report and Written Opinion of the International Searching Authority, International application No. PCT/IB2017/050839, State Intellectual Property Office of the P.R. China, dated May 22, 2017, International filing date: Feb. 15, 2017, pp. 1-12.

(Continued)

*Primary Examiner* — Beemnet Dada
(74) *Attorney, Agent, or Firm* — Kristofer L. Haggerty

(57) ABSTRACT

A computer receives a set of objects from a client, whereby at least one of the objects of the set are respectively associated and encrypted with a unique file encryption key (FEK). The computer encrypts each of the FEKs with a common master encryption key, MEK, resulting in respective locked keys. In an initial backup, the encrypted objects together with their associated locked keys are transmitted to a backup server where a first module determines if locked key has changed via referencing an encryption state associated with the encrypted objects. If an MEK has changed, the existing FEKs are re-encrypted with the changed MEK to generate new locked keys, and, in a subsequent backup operation, sending the new locked keys to the backup server to replace the existing locked keys, while avoiding transmitting to the backup server the objects whose associated FEKs are affected by the changed MEK.

11 Claims, 7 Drawing Sheets

(51) Int. Cl.
*H04L 29/06* (2006.01)
*G06F 11/14* (2006.01)

(52) U.S. Cl.
CPC ........ *H04L 9/0822* (2013.01); *H04L 63/0428* (2013.01); *G06F 2201/80* (2013.01)

(56) References Cited

U.S. PATENT DOCUMENTS

| | | | |
|---|---|---|---|
| 8,667,273 | B1 | 3/2014 | Billstrom et al. |
| 8,713,307 | B2* | 4/2014 | Nakagawa ............... G06F 21/78 709/202 |
| 8,732,479 | B1* | 5/2014 | Henriksen ........... G06F 11/1464 709/201 |
| 8,886,931 | B2* | 11/2014 | Matsunaka ........... H04L 9/0833 380/270 |
| 9,244,779 | B2* | 1/2016 | Littlefield ........... G06F 11/1469 |
| 9,338,005 | B2* | 5/2016 | Fascenda ............ G06F 11/1458 |
| 9,535,942 | B2* | 1/2017 | Hong ................ G06F 17/30371 |
| 2006/0126850 | A1 | 6/2006 | Dawson et al. |
| 2011/0293096 | A1 | 12/2011 | Reilly et al. |
| 2012/0297189 | A1 | 11/2012 | Hayton et al. |
| 2014/0281519 | A1 | 9/2014 | Erofeev et al. |

OTHER PUBLICATIONS

IBM, "AIX JFS2 encrypted file system backup," IBM Knowledge Center, https://www.ibm.com/developerworks/community/groups/service/html/communityview?http://www-01.ibm.com/support/knowledgecenter/SSGSG7_7.1.4/client/t_bac_aixencryp.html?lang=en, 2 pgs.

Microsoft, "Backup and Restore of Encrypted Files," https://msdn.microsoft.com/en-us/library/windows/desktop/aa363783%28v=vs.85%29.aspx, 2 pgs., printed Aug. 20, 2015 11:54 AM.

Muller-Wicke, D., "Integrating IBM Tivoli Storage Manager with IBM Elastic Storage," IBM Tivoli Storage Manager, Document version 1.0, 18 pgs., © International Business Machines Corporation, 2014.

* cited by examiner

After Initial Back-up 601

| FS-ID | Obj-ID | FEK State |
|---|---|---|
| 1 | 001 | UNCHANGED |
| 1 | 002 | UNCHANGED |
| 1 | 003 | NO-FEK |
| 1 | 004 | UNCHANGED |
| 1 | 005 | NO-FEK |

After Subsequent Back-up 603

| FS-ID | Obj-ID | FEK State |
|---|---|---|
| 1 | 001 | UNCHANGED |
| 1 | 002 | UNCHANGED |
| 1 | 003 | NO-FEK |
| 1 | 004 | UNCHANGED |
| 1 | 005 | NO-FEK |
| 1 | 006 | UNCHANGED |

Restore Decision Matrix 605

| Local Client FEK State | FEK exists on backup | No FEK on backup |
|---|---|---|
| NEW | Restore not allowed | Restore not allowed |
| CHANGED | Restore not allowed | Restore not allowed |
| NO-FEK | Restore not allowed | Restore allowed |
| UNCHANGED | Restore allowed | N/A |

Fig. 6

END-TO-END ENCRYPTION AND BACKUP IN DATA PROTECTION ENVIRONMENTS

BACKGROUND

The present invention relates to the field of digital computer systems, and more specifically, to a method of backing up and restoring encrypted file objects in a computer system. At present, an encrypted file which is encrypted with file system techniques and is needed to be backed-up must first be decrypted using the file system techniques and then encrypted again with the backup client and its server techniques to store it in an encrypted format in the backup server. In reverse, for a file to be restored from the backup server, it must first be decrypted with backup server techniques and then re-encrypted after it has arrived back in the file system.

SUMMARY

Various embodiments provide a system and method to backup and restore files that are encrypted by file system encryption methods.

According to an embodiment of the present invention, a computer-implemented method for performing a backup of a set of objects by a client, whereby at least some of the objects of a set of objects are respectively associated and encrypted with a unique file encryption key, FEK, is described. The method comprises: encrypting each of the FEKs with a common master encryption key, MEK, said encryption resulting in respective locked keys; transmitting, in an initial backup operation, the encrypted objects together with their associated locked keys to a backup server; determining, by a first module, if an event occurred in which a locked key of an object has changed due to a change of the MEK, the change of a locked key being determined via an encryption state associated with the object whose FEKs are affected by the change of the MEK, the encryption state indicating the change, and, in case of a changed MEK, re-encrypting the existing FEKs with the changed MEK, said re-encrypting resulting in new locked keys. In a subsequent backup operation, the new locked keys are sent to the backup server to replace the existing locked keys.

According to an embodiment of the present invention, a computer-implemented method for restoring a backup of a set of objects by a client is described. Here, at least some of the objects of the set of objects are respectively associated and encrypted with a unique file encryption key, FEK, at least some of the FEKs being stored in the backup encrypted with a common master encryption key, MEK, said encryption resulting in respective locked keys stored in the backup. Each object comprised in the backup is associated with an encryption state, the encryption state indicating if, with respect to the current backup, the locked key has changed due to a change of the MEK. The method further comprises receiving a request for a restore of one of the objects, here the method comprising: determining if the encryption state associated with the object to be restored indicates that the locked key has changed after the backup was performed; in case the encryption state associated with the object to be restored indicates that the locked key has changed after the current backup was performed, disregarding the object from restoring; in case the encryption state associated with the object to be restored indicates that the locked key is unchanged since the current backup was performed, restoring the encrypted FEK associated with said object and the object.

A further embodiment is here described in which a client computer adapted for performing a backup of a set of objects by a client, whereby at least some of the objects of the set of objects are respectively associated and encrypted with a unique file encryption key, FEK, the client computer comprising a processor and a memory, the memory comprising computer-executable instructions. Here, execution of the instructions by the processor causes the client to: encrypt each of the FEKs with a common master encryption key, MEK, said encryption resulting in respective locked keys; transmitting, in an initial backup operation, the encrypted objects together with their associated locked keys to a backup server; determining if a locked key of an object due to a change of the MEK has changed, the change of the locked key being determined via an encryption state associated with the objects whose FEKs are affected by the change of the MEK, the encryption state indicating the change; and, in case of a changed locked key, re-encrypting the existing FEKs with the changed MEK. This re-encryption results in new locked keys, which, in a subsequent backup operation are sent to the backup server to replace the existing locked keys.

According to one embodiment, a client computer adapted for restoring a backup of a set of objects by a client is described comprising the backup being stored on a backup server, wherein at least some of the objects of the set of objects are respectively associated and encrypted with a unique file encryption key, FEK, at least some of the FEKs being stored in the backup encrypted with a common master encryption key, MEK. This said encryption results in respective locked keys, which are stored in the backup. Each object comprised in the backup is associated with an encryption state, the encryption state indicating if, with respect to the current backup, the locked key has changed due to a change of the MEK. The client computer comprises a processor and a memory, the memory comprising computer executable instructions. Execution of the instructions by the processor causes the client to receive a request for a restore of one of the objects, and in response to receiving the request: determining if the encryption state associated with the object to be restored indicates that the locked key has changed after the current backup was performed; in case the encryption state associated with the object to be restored indicates that the locked key has changed after the current backup was performed, disregarding the object from restoring; in case the encryption state associated with the object to be restored indicates that the locked key is unchanged since the current backup was performed, then restoring the encrypted FEK associated with said object together with the object.

According to one embodiment, a computer program product is described comprising computer-executable instructions to perform any of the steps described above associated with the end-to-end backup and restore procedure for encrypted and non-encrypted file objects.

BRIEF DESCRIPTION OF THE DRAWINGS

In the following, embodiments of the invention are explained in greater detail, by way of example only, making reference to the drawings in which:

FIG. 6 shows examples of a table created to track encryption key changes and a restore decision matrix, in accordance with an embodiment of the invention.

DETAILED DESCRIPTION

Figure 1:
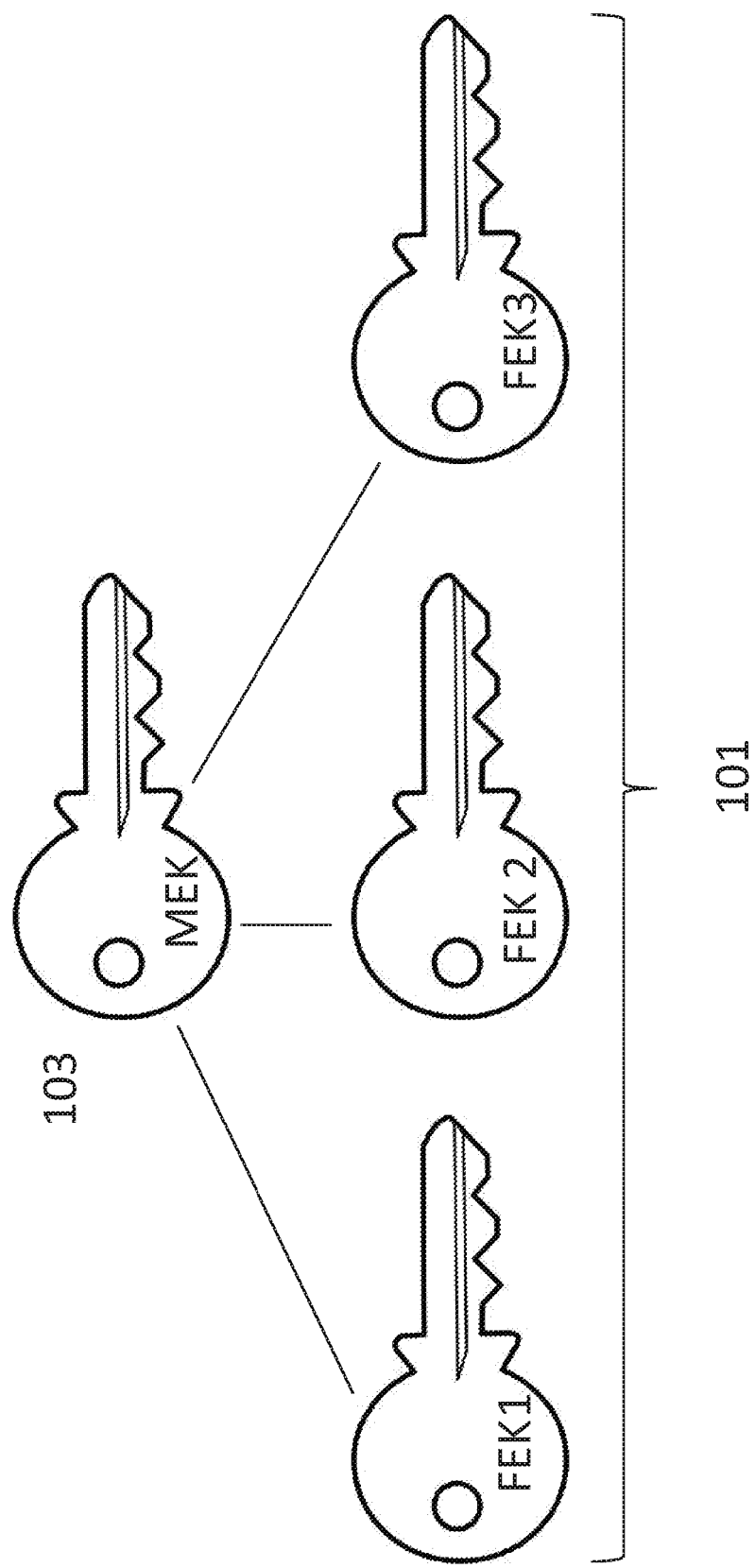
FIG. 1 depicts an encryption key hierarchy for the file system, in accordance with an embodiment of the invention.

The descriptions of the various embodiments of the present invention are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments herein disclosed.

In a conventional computer system comprised of one or more computer storage nodes coupled via a network and providing a shared file system, wherein at least one computer storage node hosts a backup client and the backup client is connected to a backup server, the file system provides the functionality to encrypt and decrypt file data while the backup client and backup server provide the functionality to encrypt and decrypt file data. However, the encryption and decryption functions of the file system are different from the encryption and decryption functions of the backup client and server. The encryption method for both the file system and the backup client and server use hierarchies of encryption keys, but the file encryption keys are not compatible. A file encrypted with file system techniques, which is to be protected by the backup client and server, must first be decrypted using the file system techniques and encrypted again with the backup client and server techniques to store it in an encrypted format in the backup server. Conversely, to restore a file residing on the backup server, which has been encrypted with backup system techniques, the file must first be decrypted using these techniques and re-encrypted again using file system techniques after it arrives on the file system.

The present method indicates a means to backup and restore files that are encrypted using file system encryption methods, whereby the file is encrypted using file system encryption and can be backed-up in this format without decryption and re-encryption with backup system methods. Thus a file encrypted with file system encryption methods is backed-up exactly in this format. This may have the advantage of avoiding a decryption using file encryption methods and re-encryption using backup system methods thus saving computing time.

By tracking encryption key changes, in the case of files whose contents have not changed between backups but whose encryption keys have changed, in a subsequent backup, the method allows for only the changed encryption key to be backed-up and not all of the file contents. This may have the advantage of accelerating a backup operation and avoiding the transmission of unchanged file data which already reside on the backup server.

Furthermore, in case a file object needs to be restored using a copy of it on the backup server, the method provides a means to determine if a restorable copy of said file exists in the backup server. This may have the advantage of avoiding the case whereby a file's encryption key has changed which is not reflected in the copy existing on the backup server.

The term 'file encryption key' is a key that is used to encrypt sections of a file. As long as the contents of the file remain unchanged, so does the file encryption key. If the file is altered, a new file encryption key is generated.

The term 'master encryption key' is a key that is used to encrypt other keys but that is not itself encrypted. Master encryption keys can also be pass phrases. Typically, master encryption keys are stored in a key store or key management software outside of the encrypted file system. File encryption keys encrypted with the master encryption key result in 'locked keys'.

According to one embodiment, the method comprises a determination by the first module if a new FEK is available, the availability of the new FEK being determined via the encryption state associated with the object whose FEK is new, and the encryption state indicating the availability of the new FEK. In case the new FEK is available, the new FEK is encrypted with the currently available MEK to obtain the associated locked key. In the subsequent backup operation, the object associated with the new FEK and encrypted with it together with the associated locked key are transmitted to the backup server. This may have the advantage that both the file data and its associated encryption are current on the backup server.

According to a further embodiment, the new FEK may be the result of any one of the following events: an object associated with an FEK was modified and thus re-encrypted with the new FEK; a new object was created and encrypted with the new FEK; a previously non-encrypted object of the set of objects was encrypted with the new FEK.

According to one embodiment, in response to detecting the event of a new FEK the method comprises the first module automatically updating the encryption state for the object that is associated with the new FEK, such updating comprising: in case the object already has an associated encryption state, replacing an existing encryption state for the object or; in case the object is without an associated encryption, associating a new encryption state with the object that is associated with the new FEK. This may have the advantage that the current encryption FEK associated with a file can be properly accounted for and updated in a future backup operation. This may also have the advantage that, in the event of a restoration of a file from the backup server, the current FEK is available.

In case the object is newly created, a new encryption state can be generated immediately for the object by the first module. Or, the newly created object can first be logged in the subsequent backup. Automatically updating the encryption state for the object that is associated with the new FEK may have the advantage of ensuring that the encryption information on the backup server is current with the encryption information for the local file object.

According to one embodiment, the first module updates the encryption state for all file objects after performing the subsequent backup, the updating comprising: changing, if available, the encryption state from the indication of availability of a new FEK to an indication according to which the FEK is unchanged; changing, if available, the encryption state from the indication that the MEK has changed to an indication according to which the FEK is unchanged. The indication of an unchanged FEK shows that both the file object's contents and its associated FEK in the backup are current. Thus, in case of a restore operation, it will be seen from the unchanged FEK state that a restore of the file object from the backup is allowed since the file object and its associated FEK on the backup server are current with the local file object and its associated FEK.

In one embodiment, in the case of a newly created encrypted file whose existence is only logged during the subsequent backup, the updating comprising indicating that the encrypted file's associated FEK is unchanged. In case of a newly created un-encrypted file whose presence is logged during the subsequent backup, the updating comprising indicating that the un-encrypted has no FEK associated with it.

This updating may have the advantage that in performing a further subsequent backup, any objects having an associated encryption state indicating that the FEK is unchanged are excluded from the backup. This may lead to a reduction both in the time and the amount of computer resources required for the subsequent backup.

According to one embodiment for which an object of the set of objects which is non-encrypted and not associated with an FEK, the associated encryption state indicates the non-availability of an FEK for the said object. For performing the subsequent backup, the method comprises: a determination by the first module of the objects for which the associated encryption state indicates the non-availability of the FEKs and; the determination by a second module of the need of a backup of said objects for which the associated encryption state indicates the non-availability of the FEKs. Determination of the need of the backup is based on a direct scan of the objects. This may have the advantage that file objects not associated with an FEK are still backed-up on the backup server.

In one embodiment, if the first module receives as an event a request for deletion of an encrypted object of the set of objects, the present method comprises changing the encryption state associated with said object to a state indicating the non-availability of an FEK for said object. This may have the advantage that an indication of a deleted object can be achieved without having to physically delete the object from the server. Since the physical deletion of a large object occupying much memory might cause a slowdown in computer operations, the changing of the associated FEK, which is a small and single object, may be advantageous and much faster.

In one embodiment, the first module comprises an event handler which automatically detects the event, and, in response to the automatic detection of the event, the event handler automatically performs the updating of the encryption state affected by the event. This may have the advantage that the encryption states are automatically updated and kept up-to-date.

According to one embodiment, the present method comprises determining an indication of the encryption state associated with the object to be restored whether or not a new FEK is available for the object. The new FEK may be the result of any one of the following events: the object associated with the FEK was modified and thus re-encrypted with the new FEK after the initial backup; the object is a new object that was created and encrypted with the new FEK after the initial backup and whose creation was immediately logged by the event handler; the object was a previously non-encrypted object that was encrypted with the new FEK after the initial backup.

In case the encryption state indicates that for the object desired to be restored, a new FEK is available, the object that is desired to be restored is disregarded for the restoring. In case the encryption state indicates that for the object that is desired to be restored, a new FEK is unavailable, the object that is desired to be restored together with its associated encrypted FEK are restored.

According to one embodiment, if the object desired to be restored was newly created since the last backup and not immediately logged upon creation by the event handler, the method comprises determining that the restoring is not possible since the object desired to be restored is not contained on the most recent backup.

This restore procedure may have the advantage that only files on the backup server with current FEKs are allowed to be restored to the file system.

According to one embodiment, the present method further comprises a determination if the encryption state associated with the object to be restored indicates that for the object, no FEK is available. In such a case, if said object is comprised in the backup not associated with a respective locked key, the object is restored. However, if the object has no FEK associated with it but said object is comprised in the backup associated with a respective locked key, the object that is desired to be restored is disregarded for the restoring.

FIG. 1 depicts an encryption key hierarchy for the file system. Components 101 (FEK 1, FEK 2, and FEK 3) correspond to respective FEKs for file system objects. Each of these FEKs is encrypted in turn by component 103, the MEK, resulting in locked keys. The MEK 103 is used to encrypt FEKs 101 but is not itself encrypted. MEK 103 can also be pass phrases. In such a system, file objects are encrypted with a unique FEK 101. These FEKs 101 are then each encrypted with the universal MEK 103 to form locked keys. The locked key for a file object is stored together with the file object on the backup server.

Figure 2:
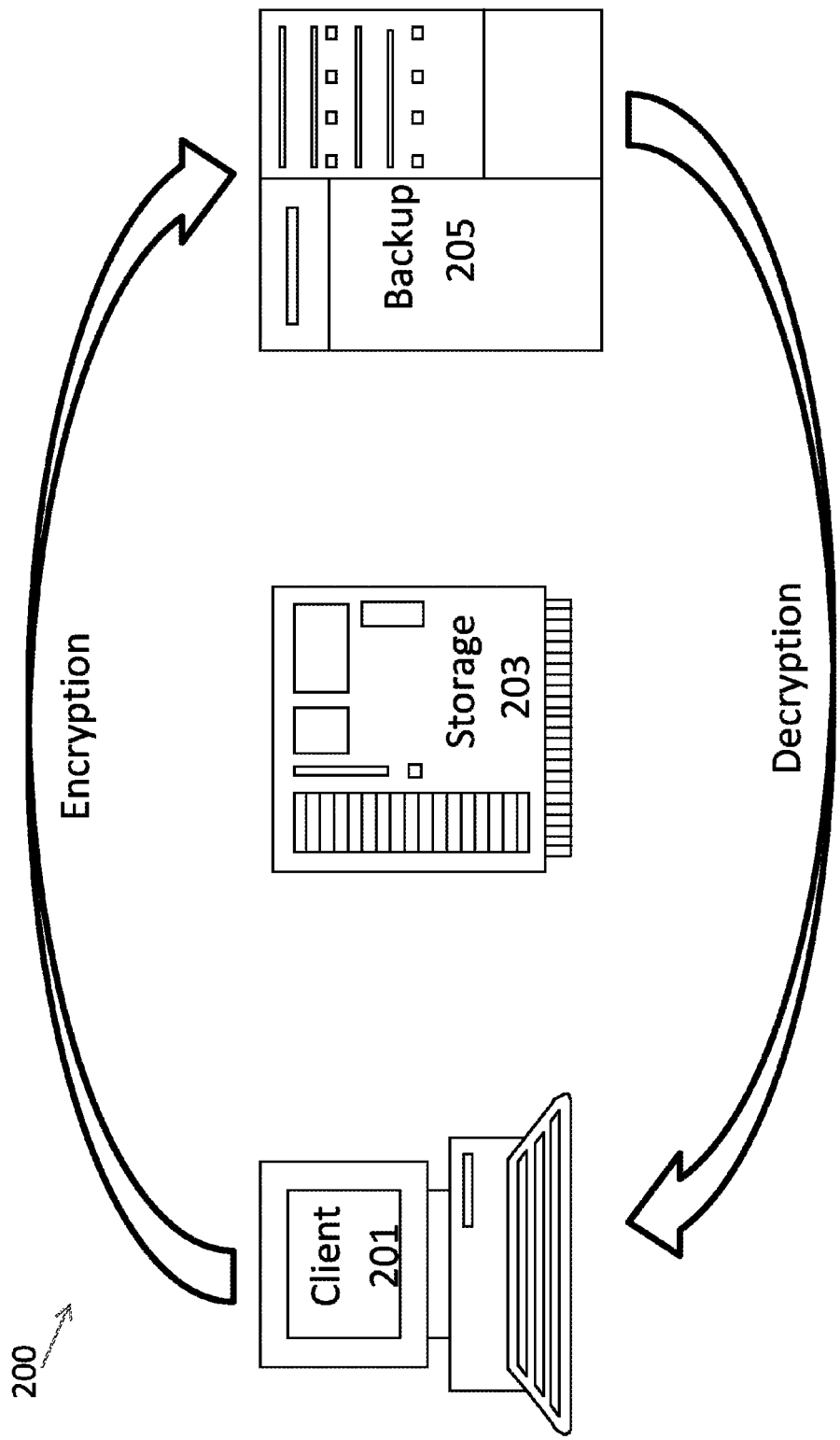
FIG. 2 illustrates an end-to-end encryption/decryption flow, in accordance with an embodiment of the invention.

FIG. 2 depicts an exemplary end-to-end encryption/decryption flow. For a backup operation, file objects are generated on the client 201. If a file object is to be encrypted, an associated FEK (101 in FIG. 1) is used for the encryption. A locked key is then generated by encrypting the FEK 101 with the MEK (103 in FIG. 1). In a backup operation, the encrypted file is transmitted through the data storage server 203 to the backup system 205. In the case that the file is encrypted, the locked key is transmitted together with the associated file. The storage server 203 may be a network attached storage. For a restore operation, files residing on the backup system 205 are transmitted through the computer data storage server 203 to be restored on the client machine 201. In case the file is encrypted, its locked key is transmitted together with the file to be restored. The end-to-end backup encryption method ensures that a current version of both the file and its locked key are available on the backup server if a restore operation is to be allowed.

Figure 3:
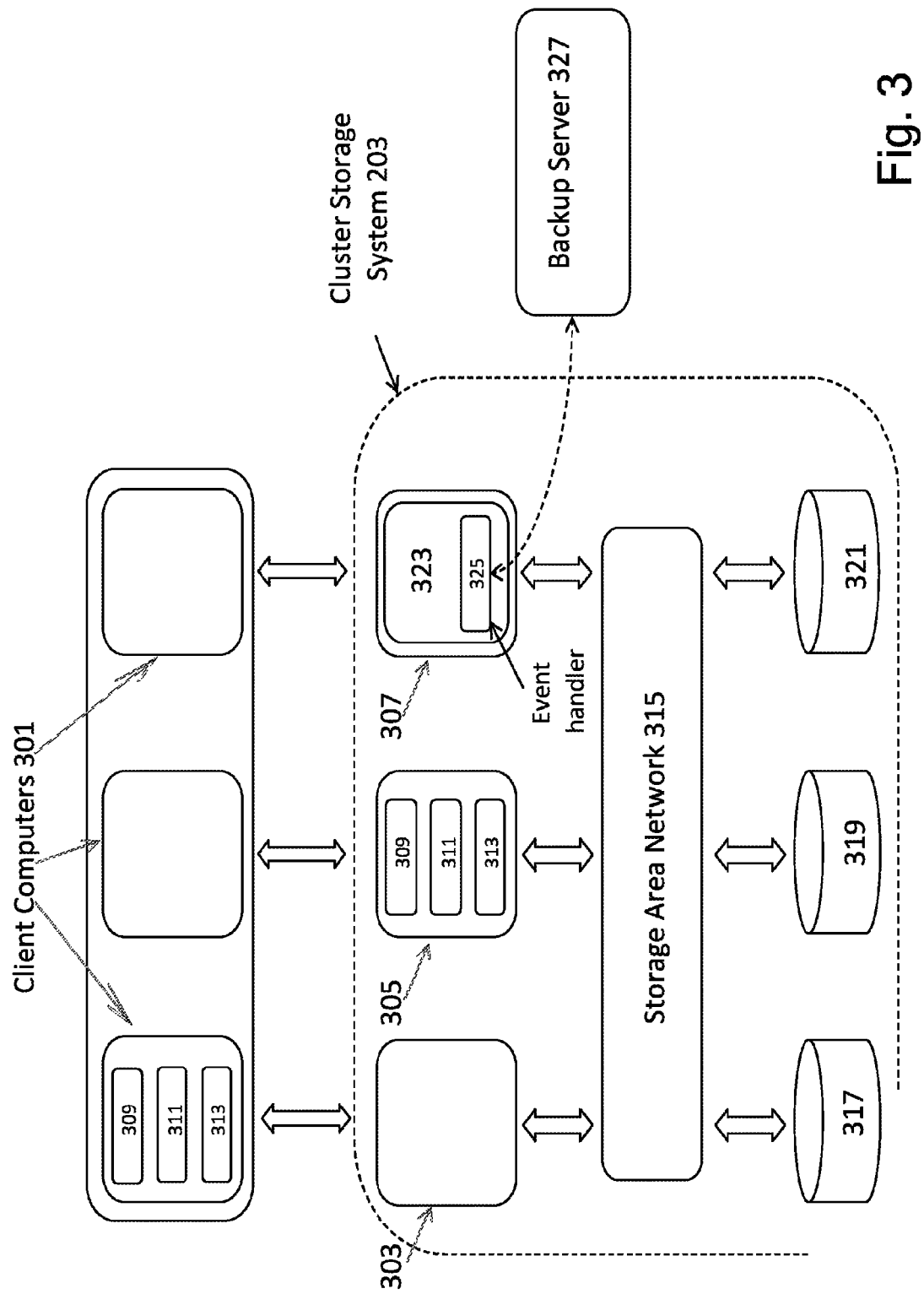
FIG. 3 depicts a cluster file system backup architecture, in accordance with an embodiment of the invention.

FIG. 3 shows a cluster file system backup architecture. One or more client computers 301, similar to component 201 of FIG. 2, is connected to storage computer nodes 303, 305, 307. One or more of these storage computer nodes 303, 305, 307 may be present. Each of the client computers 301 and storage computer nodes 303, 305, 307 is comprised of a processor 309, memory 311, and an input/output controller 313. The representative client computers 301 are connected to a cluster storage system, which is an example of the computer data storage server, 203 in FIG. 2. The cluster storage system is comprised of the storage computer nodes 303, 305, 307; a storage area network 315; and one or more disk storage components 317, 319, 321. Part of the cluster file system backup architecture comprises a backup client component 323 on which an encryption key event handler module 325 resides.

The encryption key event handler 325 logs changes in the FEK states of all pre-existing or newly created file objects. The backup client 323 and its resident encryption key event handler 325 are connected to a backup server 327, corresponding to component 205 in FIG. 2. This connection enables the backup and restoring of file system objects between the local computer nodes 303, 305, 307 and the backup server 327. In a backup operation, based on the information gathered on the encryption key event handler 325, the backup client 323 has the necessary information to decide whether, in the case of a changed or newly created file, the complete file with its associated FEK needs to be sent to the backup server 327, or, in the case of a newly encrypted existing file or a file whose locked key has changed due to a change of the MEK (103 in FIG. 1), only the changed locked key and not the file contents must be sent to the backup server 327.

Similarly, in a restore operation, with the aid of the encryption key event handler 325, it is possible to determine if the file and its locked key are current on the backup server 327 and thus suitable for a restore. The encryption key event handler 325 also indicates if the file contents or its locked key are not current on the backup server 327 and thus prevents a restore operation from occurring.

Figure 4:
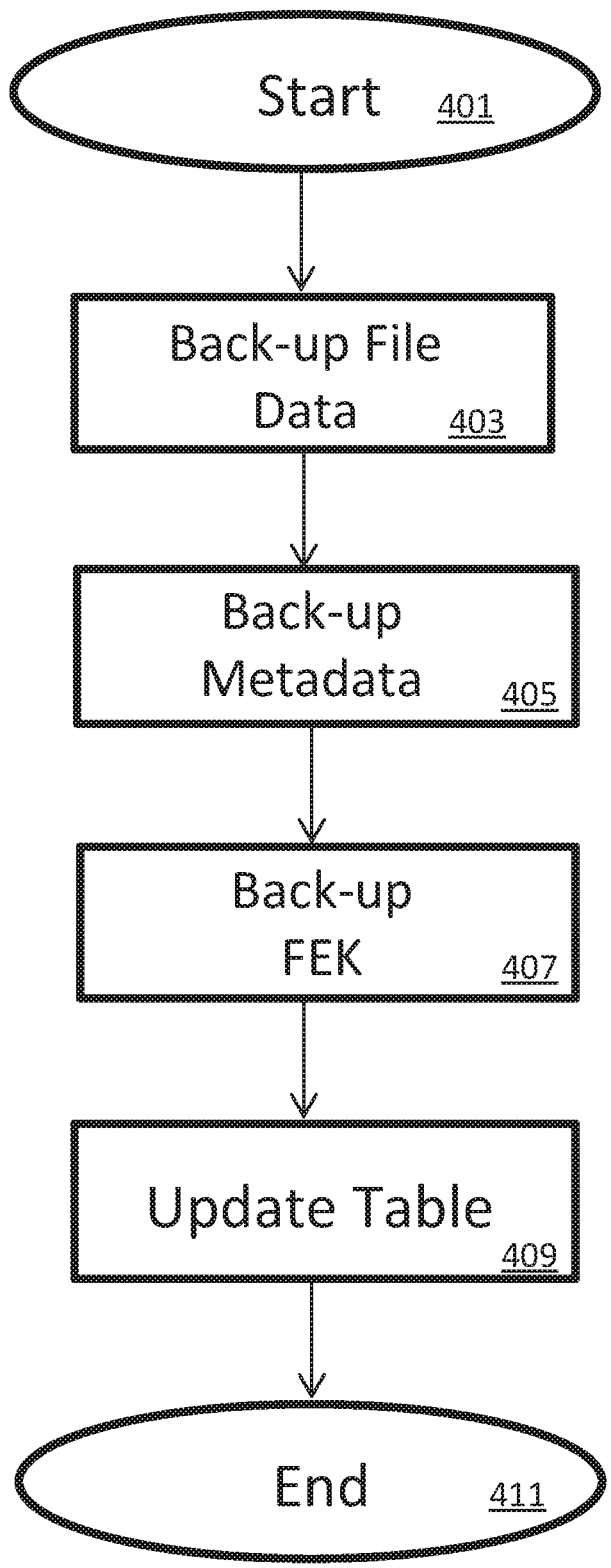
FIG. 4 depicts an end-to-end backup encryption flowchart, in accordance with an embodiment of the invention.

FIG. 4 represents an end-to-end backup encryption flowchart showing the backup process depicted in FIG. 2 in more detail. Block 401 corresponds to the start of the process. In block 403, for a file that has not previously been backed-up, an encrypted file object's data are read and copied to the backup server (component 327 in FIG. 3). In block 405, the file object's metadata which includes the locked key as well as information such as the file's source, author, creative software, and the date of its creation are read and copied to the backup server. In block 407, for an encrypted file object, its associated locked key, generated by encrypting the FEK (101 in FIG. 1) with the MEK (103 in FIG. 1), is read from the meta-data for use in block 409. In block 409, the ID and an unchanged encryption state of the backed-up file object are added to a table of backed-up objects, which is registered by the encryption key event handler 325 of FIG. 3. Or, in the case of an existing entry in the table, the information is updated to indicate an unchanged encryption state relative to the local copy of the object. The process ends with block 411.

Figure 5:
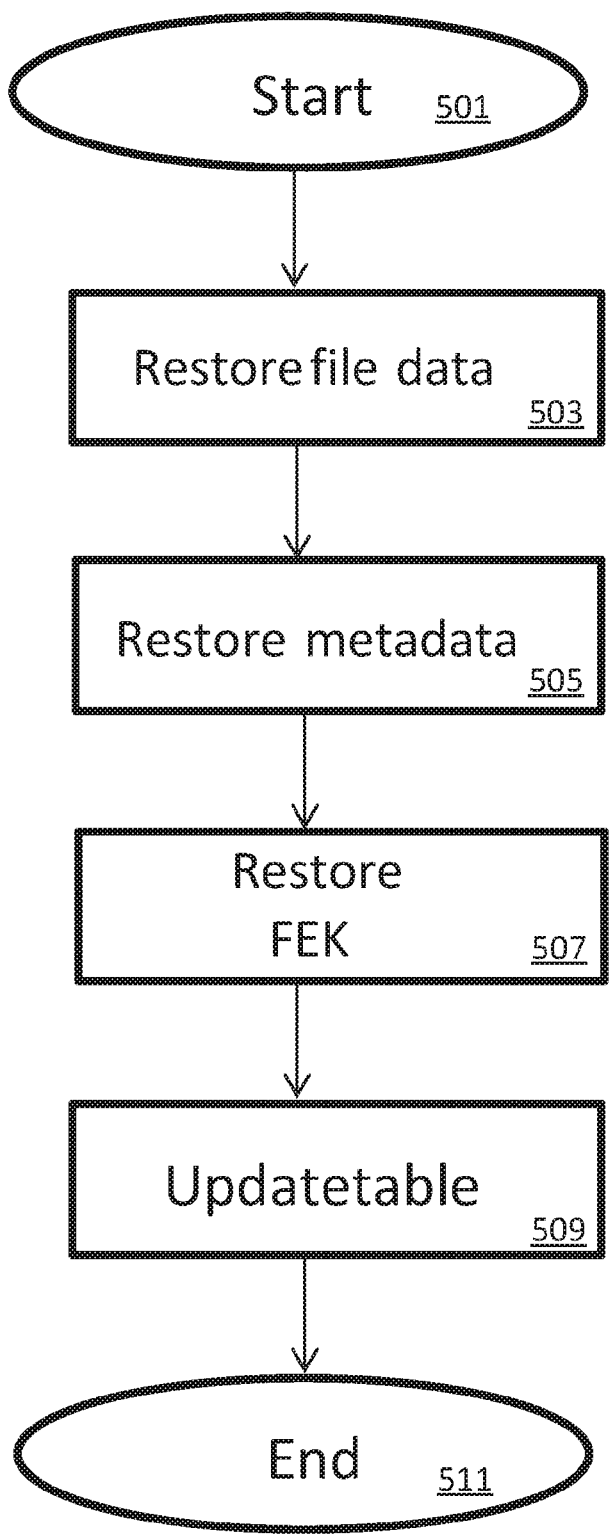
FIG. 5 shows a backed-up file object restore flowchart, in accordance with an embodiment of the invention.

FIG. 5 depicts a flow diagram showing in more detail the restore process outlined in FIG. 2. The restore process in which a backed-up file is restored to the file system can only occur if it is first determined by the information contained on the encryption key event handler (325 in FIG. 3) that both the file's contents and locked key resident on the backup server (327 in FIG. 3) are up-to-date. That is, that the encryption key for the file on the backup server is current, which is reflected in the table of file objects and their associated encryption states. The determination proceeds as follows:

If the indication in the table on the encryption key event handler (325 in FIG. 3) for a file object desired to be restored is that its associated FEK is new and an FEK exists on the backup server, then a restore is not allowed. This is because the associated FEK on the backup server doesn't match the one currently associated for the local file, meaning that the file's contents are not current on the backup and thus unfit for restoration. If, in this case, no FEK exists on the backup server, a restore is also not allowed since the encryption states on the backup server and the local server associated with the file to be restored do not match, thus having an encryption state associated with the file which is not current.

If the table entry for the file object desired to be restored indicates that its associated FEK is changed and an FEK exists on the backup server, then no restore is allowed. This is because, in this case, a changed FEK indicates that the MEK (103 in FIG. 1) used to create locked keys from the respective FEKs has changed. Therefore, because of the changed locked key, the backed-up file will not be able to be properly decrypted upon restoration. If, in this case, no FEK exists on the backup server, then no restore is allowed as well since the encryption state on the back-up server for the file to be restored indicates an unencrypted file while the file is actually encrypted.

If the file encryption state for the file object to be restored indicates that no encryption state exists for the file object and an FEK exists on the backup server, then no restore is allowed. This is because the local file to be restored is not encrypted, while its copy on the backup server is encrypted. However, in this case, if no FEK exists on the backup server, then for the file object with no associated encryption state, a restore is allowed since both the local file to be restored and its backup copy are not encrypted. In this case, it is necessary to check whether the file's contents have changed by the use of a normal backup procedure since its contents can change but remain unencrypted.

For the case of a file object to be restored whose table entry indicates an unchanged file encryption state and which has an FEK existing on the backup server, a restore is allowed since an unchanged state indicates that both the contents and locked key for the backup server copy of the file to be restored match the contents and locked key for the local file. In this case it is not possible that no FEK would exist on the backup server.

Block 501 begins the process. In block 503, the restore client receives encrypted file object data from the backup server and writes the encrypted data to the file system. In block 505, the restore client receives file object metadata containing the file object's locked key from the backup server and writes the meta-data to the file system. In block 507, the restore client selects the file object's locked key associated with said object from the received meta-data for use in block 509. In block 509, the encryption state of the restored file object is reset in the table of backed-up file objects resident on the encryption key event handler 325 of FIG. 3 to indicate an unchanged encryption state. Block 511 terminates the process.

FIG. 6 depicts an example of the table 601 kept on the encryption key event handler (325 in FIG. 3) after a first back-up operation. An example of the table after a subsequent back-up operation is shown in 603. The table created and updated as described in step 409 of FIG. 4. As described in detail for FIG. 5, to determine if a restore operation of a file from the backup server is allowed, the restore decision matrix 605 is used by the encryption key event handler (325 in FIG. 3).

The novel backup client (323 in FIG. 3) and backup server (327 in FIG. 3) may solve the problem that a file must be decrypted and encrypted again if a backup copy must be created by using an end-to-end encryption method. Further, the problem that changes in the encryption key hierarchy can't be detected automatically may be solved by a novel encryption event handling system (325 in FIG. 3). Thus, changes in the encryption key hierarchy which invalidate backup copies are handled by initiating new backups of files if required. By automatically detecting encryption key changes and initiating updates of the file in the backup server, the problem that the version of the file in the backup server can't be restored because of changed encryption keys is avoided.

FIG. 3 depicts an end-to-end backup encryption system, ETEBE, comprising the first module, to realize a single end to end encryption of files and the continuous detection of changes in the encryption key hierarchy. If the backup copy of a file becomes invalid due to encryption key changes, such changes are automatically logged by an encryption key event handler module, EKEH, (325 in FIG. 3 and corresponding to an example of the first module) integrated into the backup client (323 in FIG. 3), and, in a backup operation, this information is used to determine whether the file contents together with its associated encryption key or just the encryption key need to be backed-up.

The EKEH module (325 in FIG. 3) maintains a table for each backed-up file system (301 in FIG. 3). The table includes the file system identifier, FS-ID, which is a unique identifier to identify the file system. Furthermore the table includes an object identifier, Obj-ID, which is a unique identifier for the particular file system like files and directories which have already been backed-up by the backup client (323 in FIG. 3). Each file system object identified by the unique Obj-ID appears only once in the table. The table also includes a file encryption key state, FEK State, which can have values of: NEW (file encryption key is new and no key in the backup exists), CHANGED (file encryption key was changed since last backup), NO-FEK (file was decrypted and no encryption key exists in the file system), and UNCHANGED (encryption key in file system and backup is equal, reset to UNCHANGED after successful backup w/o encryption key changes).

The ETEBE system and method is configured to automatically detect changes of encryption keys in the file system as follows:

As an example of the first module, the EKEH module (325 in FIG. 3) registers encryption key events for files that are already backed-up. The registered events are: CREATE (occurs if an encryption key is generated for a file system object—this means that the file system object was newly encrypted either because of the file system object being newly created, a change of its contents, or the encryption of an previously un-encrypted file system object.), CHANGE (occurs if an encryption key has changed for a file system object due to the MEK (103 in FIG. 3) being changed causing the FEKs (101 in FIG. 1) to be newly encrypted resulting in new locked keys), and DESTROY (occurs if an encryption key was deleted for a file system object—means file system object was decrypted.

The encryption key events are used to update the table with the appropriate information resulting from the event type.

The ETEBE system and method is configured to read an encrypted file and create an incremental backup copy without decrypting the information by the steps outlined in FIG. 4. The ETEBE system and method is also configured to provide information about the ability to restore a file from the backup server (327 in FIG. 3). The steps to restore an encrypted file to the file system (301 in FIG. 3) are shown in FIG. 5. First, though, the backup procedure is discussed in detail.

During a first backup the backup client (323 in FIG. 3) initiates an incremental backup copy of the file system by traversing the file system structure and read the file data for each file and copy it to the backup server (327 in FIG. 3). If the file data are encrypted, the encrypted data are sent without decryption, and the encryption key together with the file's meta-data are also sent to the backup server (327 in FIG. 3). For each backed up file system object, an entry in the table is created with the given FS-ID and Obj-ID. The FEK State column is filled as follows: if the file system object has a file encryption key (FEK), then FEK State is listed as UNCHANGED. If the file system object has NO file encryption key (FEK), then FEK State is listed as NO-FEK.

After an initial backup, the table may appear as illustrated by after initial back-up 601 in FIG. 6.

After an initial backup, the encryption key events CREATE, CHANGE, and DESTROY are used to update the table with the appropriate information in the FEK State column resulting from the event type. The EKEH (325 in FIG. 3) retrieves the Obj-ID from the event and searches the appropriated entry in the table. The EKEH (325 in FIG. 3) retrieves the event type from the event and updates the FEK State column in the table as follows: In case of event type "CREATE," the FEK state will change from "NO-FEK" to "NEW". In case of event type "CHANGE," the FEK state will change from "NEW" or "UNCHANGED" to "CHANGED." In case of event type "DESTROY," the FEK state will change from "NEW," "UNCHANGED," or "CHANGED" to "NO-FEK". The update of the table based on the received event is performed continuously until the next backup occurs.

During a subsequent backup, the backup client (323 in FIG. 3) initiates an incremental backup copy of the file system by traversing the file system structure and reading the file data of the changed files as done in the prior art and copies it to the backup server (327 in FIG. 3). If the file data are encrypted, the encrypted data are sent without decryption, and the encryption key together with the file's meta-data are also sent to the backup server (327 in FIG. 3). For each backed-up file system object where no entry exists in the table, an entry is created with the given FS-ID and Obj-ID. The FEK State column is filled as follows: if the file system object has a file encryption key (FEK), then FEK State is listed as UNCHANGED. If the file system object has NO file encryption key (FEK), then the FEK State is listed as NO-FEK. If an entry for the backed up file system object exists in the table, the FEK State for that entry is set to UNCHANGED.

After a subsequent backup, the table may appear as illustrated by after subsequent back-up 603 in FIG. 6.

During a file restore, the backup client (323 in FIG. 3) determines for each requested object if the restore is allowed or not. This is necessary to avoid situations where the file on the file system has a new FEK (101 in FIG. 1), while the backed-up version of the file has an old or non-existing FEK (101 in FIG. 1) and would overwrite the local file with the wrong information. For that determination the backup client (323 in FIG. 3) uses a matrix to determine if a restore is allowed or not. The matrix includes the FEK state for the local file known from the table and the information if the corresponding file stored on the backup server (360 in FIG. 3) has an FEK or not. The matrix form is illustrated by restore decision matrix 605 in FIG. 6.

For a file object which exists on the local file system, and an overwrite or a placement to an alternate location of the file object is required, using the matrix entails searching for a file object by its Obj-ID, reading its FEK State, and querying the backup server (327 in FIG. 3) for information if the backed-up object has an FEK or not. Then use that information to find the row with the appropriate FEK State for the local file and the column with the appropriate FEK State for backup-up file on the backup server (327 in FIG. 3). Find the cross point and read off if a restore is allowed or not.

As can be seen from the matrix, there are only two states for which a restore is allowed, namely: i) if the local file has no FEK and the corresponding file on the backup server (327 in FIG. 3) also has no FEK; and ii) if the local file has an unchanged FEK, and the corresponding file on the backup server (327 in FIG. 3) also has an FEK.

If the ETEBE system has determined that a restore is allowed, the backup client (323 in FIG. 3) performs the steps outlined in FIG. 5 to copy the backed-up file from the backup server to the local file system.

Figure 7:
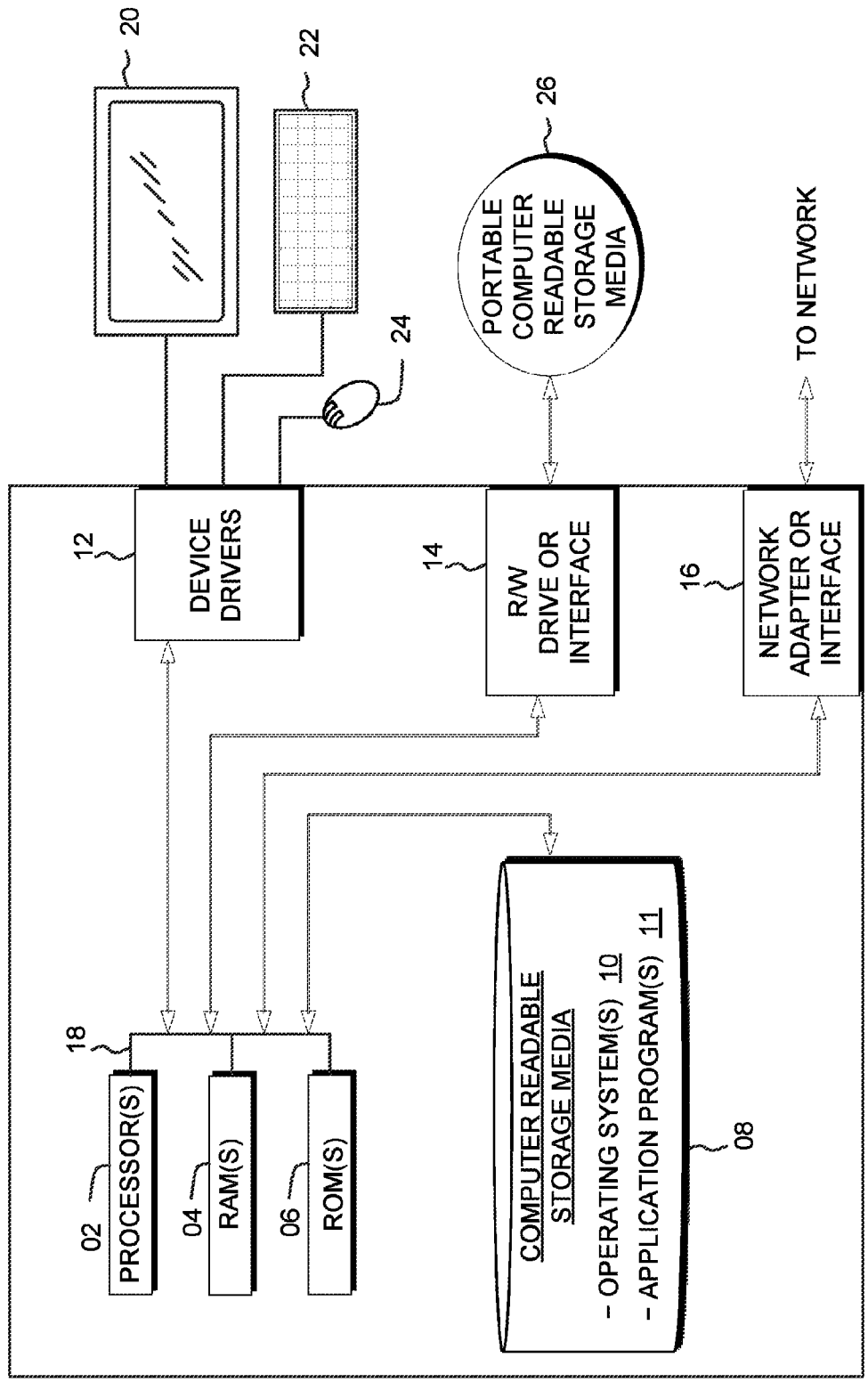
FIG. 7 illustrates a block diagram depicting the hardware components of computing devices within system 200 of FIG. 2, in accordance with an embodiment of the invention.

FIG. 7 depicts a block diagram of components of computing devices utilized in system 200 of FIG. 2, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing devices may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device may also include a R/W drive or interface 14 to read from and write to one or more portable computer readable storage media 26. Application programs 11 on the computing device may be stored on one or more of the portable computer readable storage media 26, read via the respective R/W drive or interface 14 and loaded into the respective computer readable storage media 08.

Computing devices may also include a network adapter or interface 16, such as a TCP/IP adapter card or wireless communication adapter (such as a 4G wireless communication adapter using OFDMA technology). Application programs 11 on computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing devices may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for performing a backup of a set of objects by a client, whereby at least one of the objects of the set of objects are respectively associated and encrypted with a unique file encryption key (FEK), the method comprising:
    encrypting each of the FEKs with a common master encryption key (MEK), said encryption resulting in respective locked keys;
    transmitting, in an initial backup operation, the encrypted objects together with their associated locked keys to a backup server;
    determining, by a first module, whether an event occurred in which a locked key of an object has changed due to a change of the MEK, wherein the change of the locked key is determined via an encryption state associated with the objects whose FEKs are affected by the change of the MEK, and wherein the encryption state indicates the change; and
    based on determining that an event occurred in which a locked key of an object has changed due to a change of the MEK, re-encrypting the existing FEKs with the changed MEK, wherein said re-encrypting results in new locked keys, and wherein, in a subsequent backup operation, the new locked keys are sent to the backup server to replace the existing locked keys while not transmitting to the backup server the objects whose associated FEKs are affected by the changed MEK.

2. The method of claim 1, further comprising:
    determining, by the first module, if a new FEK is available, wherein the availability of the new FEK is determined via the encryption state associated with the objects whose FEK is new, and wherein the encryption state indicates the availability of the new FEK;
    based on determining that a new FEK is available, encrypting the new FEK with the currently available MEK to obtain the associated locked key; and
    transmitting, in the subsequent backup operation, the object encrypted with the new FEK together with the associated locked key to the backup server.

3. The method of claim 2, wherein the new FEK is the result of detecting at least one of the following events:
    an object associated with an FEK was modified and thus re-encrypted with the new FEK, a new object was created and encrypted with the new FEK, and a previously non-encrypted object of the set of objects was encrypted with the new FEK.

4. The method of claim 3, the method further comprising:
based on detecting the event, updating, by the first module, the encryption state for the object that is associated with a new FEK, wherein updating the encryption state for the object that is associated with the new FEK further comprises:
determining whether the object already has an associated encryption state;
based on determining that the object already has an associated encryption state, replacing an existing encryption state for the object;
determining whether the object is without an associated encryption state;
based on determining that the object is without an associated encryption state, associating a new encryption state with the object that is associated with the new FEK;
determining whether the object is newly created; and
based on determining that the object is newly created, generating a new encryption state for the object.

5. The method of claim 2, further comprising:
updating, by the first module, the encryption state after performing the subsequent backup, wherein updating the encryption state after performing the subsequent backup further comprises:
changing, if available, the encryption state from the indication of availability of a new FEK to an indication that the FEK is unchanged; and
changing, if available, the encryption state from the indication that the MEK has changed to an indication that the FEK is unchanged, wherein any objects having an associated encryption state indicating that the FEK is unchanged are excluded from a further subsequent backup.

6. The method of claim 1, wherein the associated encryption state for an object of the set of objects which is non-encrypted and not associated with an FEK indicates the non-availability of an FEK for said object, and wherein performing a subsequent backup further comprises:
determining, by the first module, the objects for which the associated encryption state indicates the non-availability of the FEKs; and
determining, by a second module, the need of a backup of said objects for which the associated encryption state indicates the non-availability of the FEKs, wherein determining the need of the backup is based on a direct scan of the objects.

7. The method of claim 1, further comprising:
receiving, as an event, a request to delete an encrypted object of the set of objects; and
changing the encryption state associated with the encrypted object to a state indicating the non-availability of an FEK for the encrypted object.

8. The method of claim 1, wherein the first module includes an event handler, and wherein the method further comprises:
detecting, by the event handler, the event; and
in response to detecting the event, updating, by the event handler, the encryption state affected by the event.

9. A computer implemented method for restoring a backup of a set of objects by a client, whereby at least one of the objects of the set of objects are respectively associated and encrypted with a unique file encryption key (FEK), at least one of the FEKs being stored in the backup encrypted with a common master encryption key (MEK), said encryption resulting in respective locked keys, said locked keys stored in the backup, each object that is comprised in the backup being associated with an encryption state, the encryption state indicating if, with respect to the current backup, the locked key has changed due to a change of the MEK, the method comprising:
receiving a request for a restore one of the objects;
determining if the encryption state associated with the object to be restored indicates that the locked key has changed after the current backup was performed;
based on determining that the encryption state associated with the object to be restored indicates that the locked key has changed after the current backup was performed, disregarding the object from restoring; and
based on determining that the encryption state associated with the object to be restored indicates that the locked key is unchanged since the current backup was performed, restoring the encrypted FEK associated with said object and the object.

10. The method of claim 9, further comprising:
determining whether the encryption state associated with the object to be restored indicates that a new FEK is available, wherein the new FEK is the result of at least one of the following events:
the object associated with the FEK was modified and thus re-encrypted with the new FEK after the initial backup;
the object is a new object that was created and encrypted with the new FEK after the initial backup; and
the object was a previously non-encrypted object that was encrypted with the new FEK after the initial backup;
based on determining that the encryption state associated with the object to be restored indicates that a new FEK is available, disregarding the object that is desired to be restored; and
based on determining that the encryption state associated with the object to be restored indicates that a new FEK is unavailable, the object that is desired to be restored and the encrypted FEK associated with said object are restored.

11. The method of claim 9, further comprising:
determining whether the encryption state associated with the object to be restored indicates that no FEK is available;
based on determining that the encryption state associated with the object to be restored indicates that no FEK is available, determining whether the object to be restored is associated with a respective locked key in the backup;
based on determining that the object to be restored is not associated with a respective locked key in the backup, restoring the object to be restored, and
based on determining that the object to be restored is associated with a respective locked key in the backup, disregarding the object that is desired to be restored.

* * * * *